United States Patent
Shen et al.

(10) Patent No.: US 6,698,105 B2
(45) Date of Patent: Mar. 2, 2004

(54) TOOL AND METHOD FOR MEASURING DEPTH OF COUNTERSUNK PORTION OF A HOLE

(75) Inventors: He Yun Shen, Shenzhen (CN); Sheng Liu, Shenzhen (CN); Yong-Qiang Zhao, Shenzhen (CN); Guili Dong, Shenzhen (CN); Longhai Huang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/305,047

(22) Filed: Nov. 25, 2002

(65) Prior Publication Data

US 2003/0217479 A1 Nov. 27, 2003

(30) Foreign Application Priority Data

May 24, 2002 (TW) .......................... 91110974 A

(51) Int. Cl.⁷ ................................. G01B 3/28
(52) U.S. Cl. .......................... 33/836; 33/531
(58) Field of Search ................. 33/836, 832, 833, 33/531, 534

(56) References Cited

U.S. PATENT DOCUMENTS

| | | | | |
|---|---|---|---|---|
| 2,349,879 A | * | 5/1944 | Ogren | 33/531 |
| 2,445,060 A | * | 7/1948 | Gearhart | 33/836 |
| 2,758,382 A | * | 8/1956 | Hurd | 33/836 |
| 2,975,524 A | * | 3/1961 | Field | 33/534 |
| 2,979,824 A | * | 4/1961 | Hymer | 33/531 |
| 3,116,560 A | * | 1/1964 | Matthews | 33/534 |
| 5,189,808 A | * | 3/1993 | Evans et al. | 33/836 |
| 5,758,433 A | * | 6/1998 | Alberts | 33/836 |
| 6,434,850 B1 | * | 8/2002 | Eiden et al. | 33/531 |

* cited by examiner

Primary Examiner—Christopher W. Fulton
(74) Attorney, Agent, or Firm—Wei Te Chung

(57) ABSTRACT

A tool for measuring depths of countersunk holes includes a worktable (1), a measuring member (30), and a display device (50). The worktable includes a measuring plate (10) defining four adjusting screw holes (17) in four corners thereof, and four adjusting rods (28) adjustably attached in the adjusting screw holes below the measuring plate. The adjusting rods are adjusted so that the measuring plate can be level. The measuring member is generally cylindrical, and includes a cylindrical head (32) having a conical tip (34). The display device includes a vertical central shaft (58), and a bearing sleeve (60) surrounding a bottom of the central shaft. The central shaft can move vertically through the bearing sleeve. The display device further includes a cylindrical body (52) having a display (54) showing a height value of a top face of the central shaft, and a zeroing button (56).

21 Claims, 2 Drawing Sheets

TOOL AND METHOD FOR MEASURING DEPTH OF COUNTERSUNK PORTION OF A HOLE

BACKGROUND OF THE INVENTION

1. Field of the Invention

The present invention relates to a tool and a method for measuring depths of countersunk holes and, in particular, a tool having simple structure and a method that is correspondingly quick and accurate.

2. Description of Related Art

China Patent Application No. 95194539.4 discloses a method for measuring depths of holes that utilizes reflection or transmission of light. Maximum and minimum light intensities vary according to the depths of the holes being measured. Then by comparing a structure and its corresponding light wavelength, a depth of a hole can be determined. However, the method is only for measuring the depth of a cylindrical hole. Numerous structures have holes comprising a countersunk portion adjoining a cylindrical portion. Typically, the countersunk portion is tapered such that it resembles a truncated cone. The disclosed method cannot accurately measure depths of such holes.

SUMMARY OF THE INVENTION

Accordingly, an object of the present invention is to provide a tool having simple structure and low cost for measuring depths of countersunk holes accurately and quickly.

Another object of the present invention is to provide a method for measuring a depth of a countersunk hole accurately and quickly.

To achieve the first above-mentioned object, a tool of the present invention for measuring depths of countersunk holes includes a worktable, a measuring member and a display device. The worktable comprises a measuring plate defining four adjusting screw holes in four corners thereof, and four adjusting rods adjustably attached in the adjusting screw holes below the measuring plate. The extents to which the adjusting rods are received in the adjusting screw holes are adjusted so that the measuring plate can be level. The measuring member is generally cylindrical, and comprises a cylindrical head having a conical tip. The display device comprises a vertical central shaft, and a bearing sleeve surrounding a bottom of the central shaft. The central shaft can move vertically through the bearing sleeve. The display device further comprises a cylindrical body having a display showing a height value of a top face of the central shaft, and a zeroing button.

A typical workpiece defines a tapered countersunk hole, and a cylindrical hole below and in communication with the countersunk hole. An angle of inclination of the conical tip of the measuring member is less than a corresponding angle of inclination of an inner inclined annular wall of the workpiece at the countersunk hole.

When measuring a depth of the countersunk hole of the workpiece, the cylindrical hole of the workpiece is placed around the conical tip of the measuring member. The workpiece is pressed downwardly so that a bottom face thereof abuts the measuring plate. The zeroing button is pressed, and zero is shown on the display of the display device. Then the workpiece is turned upside down, and the countersunk hole is placed around the conical tip of the measuring member. The workpiece is pressed downwardly so that an inverted top face thereof abuts the measuring plate. The value shown on the display is equal to the depth of the countersunk hole.

Other objects, advantages and novel features of the present invention will become more apparent from the following detailed description when taken in conjunction with the accompanying drawings, in which:

DETAILED DESCRIPTION OF THE INVENTION

Figure 1:
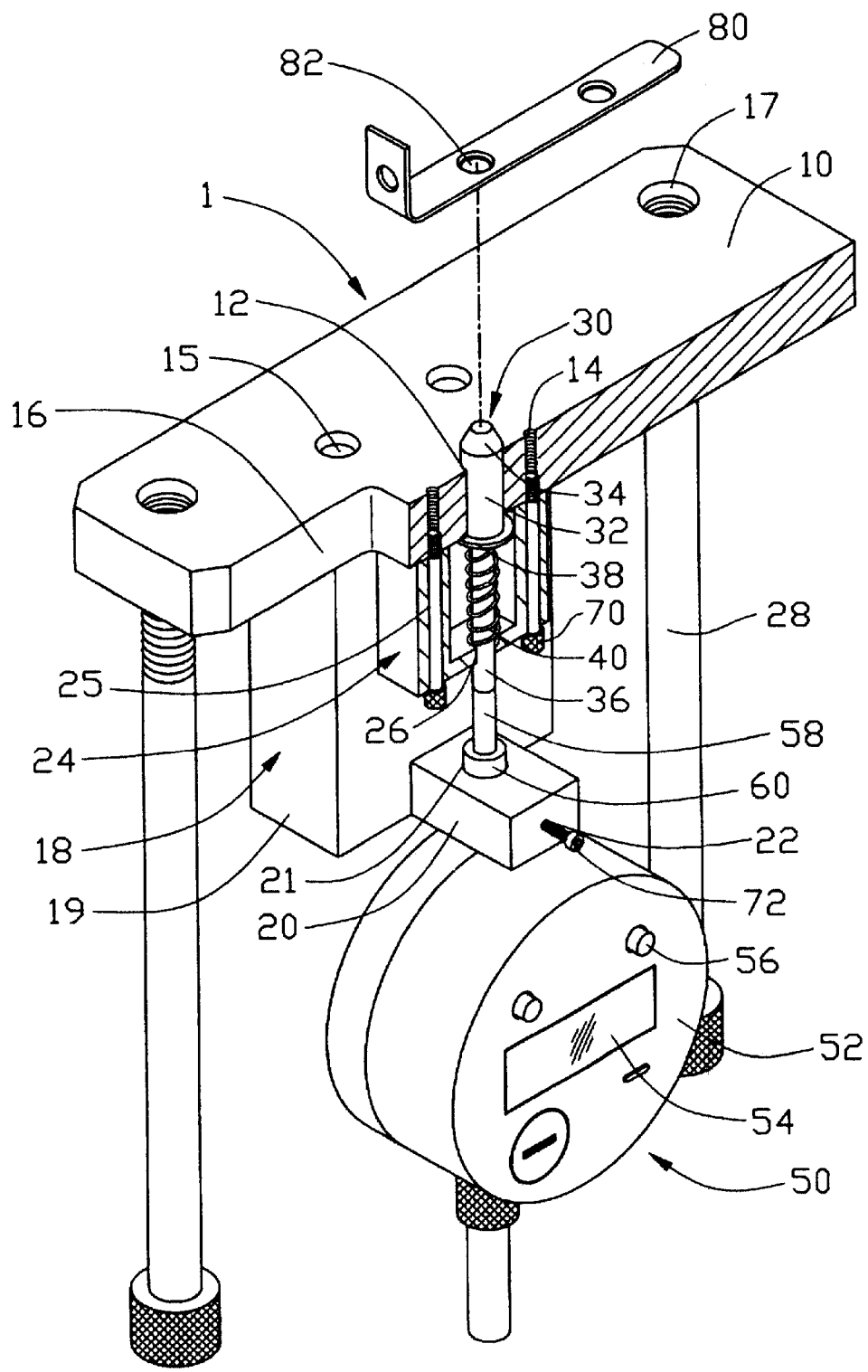
FIG. 1 is a partly cut-away, isometric view of a tool in accordance with the present invention, and a workpiece.

Referring to FIG. 1, a tool for measuring depths of countersunk holes includes a worktable 1, a measuring member 30 and a display device 50.

The worktable 1 comprises a measuring plate 10, an L-shaped fastener 18 fixed under the measuring plate 10, a U-shaped container 24 below the measuring plate 10 and adjacent the L-shaped fastener 18, and four adjusting rods 28 below the measuring plate 10 at four corners of the measuring plate 10 respectively. The measuring plate 10 defines a central opening 12. Two screw holes 14 are defined in the measuring plate 10 at opposite sides of the opening 12 respectively. Two locking holes 15 for securing of the L-shape fastener 18 are defined in the measuring plate 10 at one side of the opening 12, generally opposite the screw holes 14 respectively. A gap 16 is defined in the measuring plate 10, spanning from an end edge of the measuring plate 10 to the vicinity of a nearest one of the screw holes 14. The measuring plate 10 also defines four adjusting screw holes 17 at four corners thereof respectively. The adjusting rods 28 are threadedly received in the adjusting screw holes 17 respectively. The extents to which the adjusting rods 28 are received in the adjusting screw holes 17 are adjusted so that the measuring plate 10 can be level. The L-shaped fastener 18 includes a vertical base 19, and a horizontal protrusion 20 extending perpendicularly from a bottom of the base 19. Two screw holes (not shown) are defined in a top portion of the base 19, corresponding to the locking holes 15 of the measuring plate 10. Two screws are extended through the locking holes 15 to engage in said screw holes. The protrusion 20 defines a vertical through hole 21 in a top face thereof. A horizontal screw opening 22 is defined in an end portion of the protrusion 20, and communicates with the through hole 21. The U-shaped container 24 defines two vertical locking holes 25, corresponding to the screw holes 14 of the measuring plate 10. A pair of screws 70 is received through the locking holes 25 and engaged in the screw holes 14, thereby fixing the U-shaped container 24 to the measuring plate 10. A bottom wall of the U-shaped container 24 defines a central vertical through hole 26, corresponding to the opening 12 of the measuring plate 10.

Figure 2:
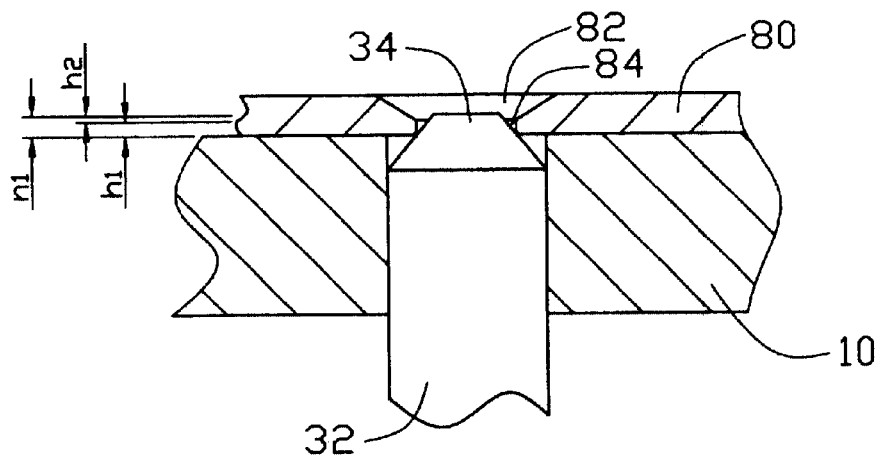
FIGS. 2–3 are enlarged, schematic sectional views of parts of a measuring table and a cylindrical head of the tool of FIG. 1 together with a part of the workpiece of FIG. 1, showing two successive stages in a process in accordance with the present invention of measuring a countersunk hole of the workpiece.
Figure 3:
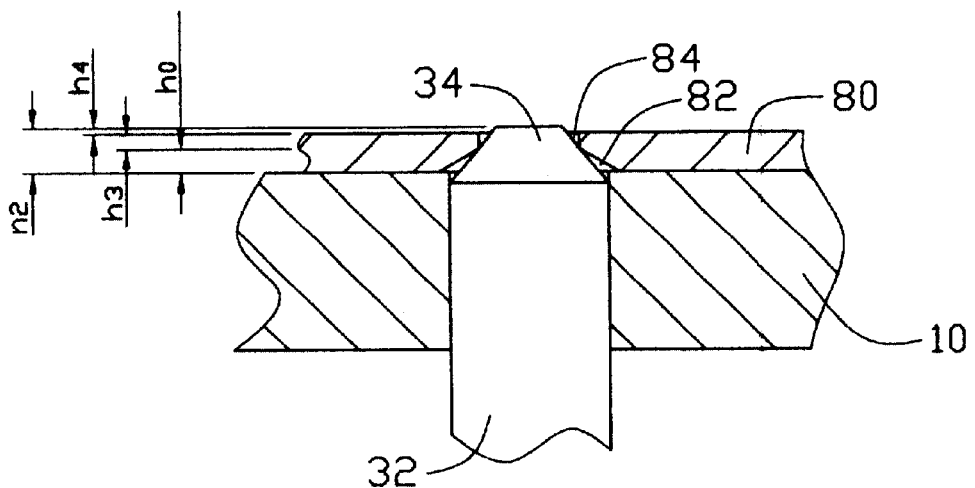

The measuring member 30 is generally cylindrical, and sequentially comprises from bottom to top: a thin pole 36, a discoid flange 38, and a cylindrical head 32 having a conical tip 34. A coil spring 40 is located around the pole 36, and a top end of the spring 40 abuts against the discoid flange 38. Referring also to FIGS. 2 and 3, a workpiece 80 defines a pair of spaced tapered countersunk holes 82, and a pair of cylindrical holes 84 below and in communication with the countersunk holes 82 respectively. An angle of inclination of the conical tip 34 of the measuring member 30 is less than a corresponding angle of inclination of an inner inclined annular wall of the workpiece 80 at each of the countersunk holes 82.

The display device 50 comprises a cylindrical body 52, a vertical central shaft 58 above the cylindrical body 52, and a bearing sleeve 60 fixed at a top of the cylindrical body 52 in the through hole 21 of the protrusion 20 of the fastener 18. The bearing sleeve 60 surrounds a bottom of the central shaft 58, which can move vertically through the bearing sleeve 60. The cylindrical body 52 comprises a display 54 and a zeroing button 56. The display 54 shows a height value of a top face of the central shaft 58. A bottom face of the pole 36 of the measuring member 30 abuts on the top face of the central shaft 58. Therefore, the value shown on the display 54 is a height of the conical tip 34 of the measuring member 30. A screw 72 is screwed into the screw opening 22 of the protrusion 20.

In assembly, the spring 40 is placed around the pole 36 of the measuring member 30. The pole 36 is inserted through the through hole 26 of the U-shaped container 24. A bottom end of the spring 40 abuts against an internal face of the bottom wall of the U-shaped container 24. The cylindrical head 32 of the measuring member 30 is inserted through the opening 12 of the measuring plate 10. The L-shaped fastener 18 is fixed to the lower face of the measuring plate 10 with the screws (not labeled). The through hole 21 of the protrusion 20, the through hole 26 of the U-shaped container 24 and the opening 12 of the measuring plate 10 are all coaxial with one another. The bearing sleeve 60 of the display device 50 is inserted into the through hole 21 of the protrusion 20, and the screw 72 is screwed into the screw opening 22 of the protrusion 20. A distal end of the screw 72 abuts the bearing sleeve 60, thereby fixing the display device 50 to the protrusion 20 of the L-shaped fastener 18. The top face of the central shaft 58 of the display device 50 abuts against the bottom face of the pole 36 of the measuring member 30. Then the adjusting rods 28 are adjustingly screwed in the adjusting screw holes 17 of the measuring plate 10, so that the measuring plate 10 is level.

Referring particularly FIGS. 2—3, in use, the workpiece 80 is placed on the measuring plate 10 of the worktable 1. One of the cylindrical holes 84 of the workpiece 80 receives the conical tip 34 of the measuring member 30. The workpiece 80 is pressed downwardly, so that a bottom face thereof abuts a top face of the measuring plate 10 (as shown in FIG. 2). A height value n1 of the conical tip 34 above the top face of the measuring plate 10 equals a sum of an axial length h1 of the cylindrical hole 84 and an axial length h2 of the conical tip 34 that protrudes above the cylindrical hole 84 into the adjoining countersunk hole 82, i.e. n1=h1+h2. Then the zeroing button 56 is pressed. Zero is shown on the display 54. This corresponds to an initial value m1 of a height of a top end of the conical tip 34, i.e. m1=0.

Then the workpiece 80 is turned upside down, and again placed on the measuring plate 10. Said corresponding adjoining countersunk hole 82 of the workpiece 80 receives the conical tip 34 of the measuring member 30. The workpiece 80 is pressed downwardly, so that an inverted top face thereof abuts the top face of the measuring plate 10 (as shown in FIG. 3). A height value n2 of a top face of the conical tip 34 above the top face of the measuring plate 10 equals a sum of an axial length h0 of the conical tip 34 received in the countersunk hole 82, an axial length h3 of the cylindrical hole 84 and an axial length h4 of the conical tip 34 that protrudes above the cylindrical hole 84, i.e. n2=h0+h3+h4. The length h1 and the length h3 are equal, i.e. h1=h3. The length h2 and the length h4 are equal, i.e. h2=h4. A value shown on the display 54 corresponds to a new height m2 of the top face of the conical tip 34. Because a thickness of the measuring plate 10 is constant, a difference m0 between the two measured heights of the top face of the conical tip 34 equals the difference between the two measured heights of the conical tip 34 protruding above the measuring plate 10. That is, m0=n2−n1=(h0+h3+h4)−(h1+h2)=h0. The value m0 equals the difference between the two values shown on the display 54, i.e. m0=m2−m1=m2. Therefore the axial length h0 equals the value m2, i.e. the value m2 shown on the display is the axial length h0 of the countersunk hole 82.

The tool of the present invention can be adapted to measure various tapered countersunk holes of various workpieces. The measuring member 30 can be replaced by another measuring member having a different angle of inclination of its conical tip, whereby said angle of inclination of said conical tip is less than a corresponding angle of inclination of an inner inclined annular wall at a countersunk hole of another workpiece to be measured.

It is to be understood, however, that even though numerous characteristics and advantages of the present invention have been set forth in the foregoing description, together with details of the structure and function of the invention, the disclosure is illustrative only, and changes may be made in detail, especially in matters of shape/configuration, size/dimension, and arrangement of parts within the principles of the invention to the full extent indicated by the broad general meaning of the terms in which the appended claims are expressed. For example, other type, even a cylindrical type, countersink hole 82 may be employed as long as such countersink hole is larger than the cylindrical hole 84.

What is claimed is:

1. A tool for measuring depths of countersunk holes, comprising:

a worktable comprising a measuring plate defining an opening, a fastener, and a container, the fastener and the container being fixed under the measuring plate;

a measuring member received in the container and comprising a cylindrical head extending through the opening beyond the measuring plate, a pole connected below the cylindrical head and an elastic member surrounding the pole, the cylindrical head having a conical tip adapted for inserting into the countersunk holes; and a display device connected to a bottom of the pole for displaying measured depths.

2. The tool as claimed in claim 1, wherein the fastener is generally L-shaped and comprises a base and a protrusion extending from a bottom of the base.

3. The tool as claimed in claim 2, wherein two screw holes are defined in a top portion of the base and two locking holes are defined in the measuring plate at one side of the opening, corresponding to the screw holes respectively.

4. The tool as claimed in claim 1, wherein the container is generally U-shaped, and defines a through hole corresponding to the opening of the measuring plate.

5. The tool as claimed in claim 1, wherein the display device comprises a central shaft connecting to the bottom of the pole, and a cylindrical body having a display which can show a height of a top of the central shaft.

6. The tool as claimed in claim 5, wherein the display device further comprises a bearing sleeve for movable extension of the central shaft therethrough, and the protrusion defines a through hole fixedly receiving the bearing sleeve therein.

7. The tool as claimed in claim 1, wherein the measuring plate defines a plurality of adjusting screw holes at respective corners thereof.

8. The tool as claimed in claim 7, wherein the worktable further comprises a plurality of adjusting rods adjustably received in the adjusting screw holes.

9. The tool as claimed in claim 1, wherein the measuring member further comprises a discoid flange, and the elastic member is compressed between the discoid flange and a bottom of the container.

10. The tool as claimed in claim 9, wherein the elastic member is a spring.

11. A method for measuring a depth of a countersunk hole of a workpiece, the countersunk hole being defined at a top face of the workpiece, the workpiece further defining a cylindrical hole at a bottom face thereof in communication with the countersunk hole, the method comprising the following steps:

providing a tool including a worktable, a measuring member and a display device; the worktable comprising a measuring plate defining an opening, an L-shaped fastener having a protrusion, and a container fixed under the measuring plate at the opening, the measuring member being received in the container and comprising a cylindrical head extending through the opening beyond the measuring plate and a spring attached below the cylindrical head, the cylindrical head having a conical tip, the display device being connected to the measuring member for displaying a height of the conical tip;

placing the workpiece on the measuring plate such that the conical tip of the cylindrical head extends into the cylindrical hole, pressing the workpiece so that a bottom face thereof abuts the measuring plate, and zeroing the display;

turning the workpiece upside down, placing the workpiece on the measuring plate such that the conical tip of the cylindrical head extends through the countersunk hole into the cylindrical hole, and pressing the workpiece so that an inverted top face thereof abuts the measuring plate, whereby a value shown on the display is a depth of the countersunk hole.

12. A method of measuring a depth of a countersink portion of a through hole in a workpiece, wherein said workpiece includes two opposite surfaces through which said through hole extend, and a vertical portion is located axially beside said countersink portion in the through hole, a diameter of said vertical portion being essentially equal to an inner end diameter defined by said countersink portion, the method comprising steps of:

providing a measuring head with a conical tip section in a front end thereof, a space provided by said countersink portion dimensioned to be large enough to receive a portion of the conical tip section without interference, a small end diameter defined by the conical tip section being smaller than the diameter of the vertical portion while a large end diameter defined by the conical tip section being larger than the diameter of the vertical portion;

inserting the measuring head into the through hole from the vertical portion thereof until the conical tip section abuts against the vertical portion, thus obtaining a first axial position/value of the measuring head relative to the through hole of the workpiece;

inserting the measuring head into the through hole from the countersink portion until the conical tip section abuts against an inner end of said conical countersink portion, thus obtaining a second axial position/value of the measuring head relative to the through hole; and calculating difference between the first axial position/value and the second axial position/value to obtain an axial depth of said counter sink.

13. The method as claimed in claim 12, wherein said conical tip section is configured/dimensioned to have a distal tip thereof not extend out of the through hole when said measuring head is inserted into the through hole from the vertical portion and abuts against the vertical portion.

14. The method as claimed in claim 12, wherein said countersink portion is conical, and an angle of said conical tip section relative to an axis of the measuring head is smaller than that of the conical countersink portion relative to another axis of the through hole so as not to interfere with each other when said measuring head is inserted into the through hole from the countersink portion.

15. The method as claimed in claim 12, wherein the large end diameter of the conical tip section is smaller than an outer end diameter of the countersink portion.

16. The method as claimed in claim 12, wherein said conical tip section defines an axial dimension larger than an axial dimension of said through hole.

17. In combination, a workpiece defining two opposite parallel surface with a through hole extending therethrough, said through hole defining a vertical portion and a countersink portion thereof, a diameter of the vertical portion being essentially equal to an inner end diameter of said countersink portion;

a measuring head defining a conical tip section in a front end thereof;

a space provided by said countersink portion dimensioned to be large enough to receive a portion of the conical tip section without interference, a small end diameter defined by the conical tip section being smaller than the diameter of the vertical portion while a large end diameter defined by the conical tip section being larger than the diameter of the vertical portion; wherein an axial depth of said countersink portion is defined by a difference between a first measuring value reflecting a relative axial final position between the through hole and the measuring head when said measuring head is inserted into the through hole from the vertical portion and a second measuring value reflecting another relative axial final position between the through hole and the measuring head when said measuring head is inserted into the through hole from the countersink portion.

18. The combination as claimed in claim 17, wherein said conical tip section is configured/dimensioned to have a distal tip thereof not extend out of the through hole when said measuring head is inserted into the through hole from the vertical portion and abuts against the vertical portion.

19. The method as claimed in claim 17, wherein said countersink portion is conical, and an angle of said conical tip section relative to an axis of the measuring head is smaller than that of the conical countersink portion relative to another axis of the through hole so as not to interfere with each other when said measuring head is inserted into the through hole from the countersink portion.

20. The method as claimed in claim 17, wherein the large end diameter of the conical tip section is smaller than an outer end diameter of the countersink portion.

21. The method as claimed in claim 17, wherein said conical tip section defines an axial dimension larger than an axial dimension of said through hole.

* * * * *